(12) United States Patent
Cideciyan et al.

(10) Patent No.: US 7,286,595 B2
(45) Date of Patent: Oct. 23, 2007

(54) APPARATUS USING A LENGTHENED EQUALIZATION TARGET FILTER WITH A MATCHED FILTER METRIC IN A VITERBI DETECTOR

(75) Inventors: Roy D. Cideciyan, Rueschlikon (CH); Ajay Dholakia, Gattikon (CH); Evangelos Eleftheriou, Zurich (CH); Richard L. Galbraith, Rochester, MN (US); Thomas Mittelholzer, Zurich (CH); Travis R. Oenning, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 788 days.

(21) Appl. No.: 10/683,645

(22) Filed: Oct. 10, 2003

(65) Prior Publication Data

US 2005/0078772 A1    Apr. 14, 2005

(51) Int. Cl.
    *H03K 9/00* (2006.01)
(52) U.S. Cl. ..................................... 375/229
(58) Field of Classification Search ............... 375/229, 375/230, 231, 232
    See application file for complete search history.

(56) References Cited

U.S. PATENT DOCUMENTS 5,689,532 A    11/1997    Fitzpatrick
6,201,839 B1   3/2001     Kavcic et al.
6,373,906 B1   4/2002     Cideciyan et al.
6,377,635 B1   4/2002     Cideciyan et al.
2002/0154620 A1* 10/2002   Azenkot et al. ............ 370/347

OTHER PUBLICATIONS

Gopalaswamy et al., "Decision-Directed Correction for Bloom in Optical Recording Channels," *Jpn. J. Appl. Phys.*, vol. 39, Feb. 2000, pp. 834-836.

Indukumar, K.C., "A Novel Post-processing Scheme for Threshold Detection on d=2 Optical Channels," Proceedings of IEEE International Conference Global Telecommunications (GLOBECOM), San Antonio, USA, Nov. 2001, pp. 1479-1483.

* cited by examiner

*Primary Examiner*—Kevin Kim

(57) ABSTRACT

An apparatus that uses a lengthened equalization target filter with a matched filter metric in a Viterbi detector is disclosed. The equalization target includes a base partial response component, i.e., $(1-D^2)$, a fractional coefficient polynomial component to whiten the noise, i.e., $(1+p_1 D+p_2 D^2)$, and a time-reversed replica of the noise-whitening component. Thus, the time-reversed replica of the noise-whitening component comes from what was formerly a matched filter component.

32 Claims, 6 Drawing Sheets

APPARATUS USING A LENGTHENED EQUALIZATION TARGET FILTER WITH A MATCHED FILTER METRIC IN A VITERBI DETECTOR

BACKGROUND OF THE INVENTION

1. Field of the Invention

This invention relates in general to data signal detection in a data channel, and more particularly to an apparatus using a lengthened equalization target filter with a matched filter metric in a Viterbi detector.

2. Description of Related Art

Recently developed data storage devices, such as magnetic disk drive devices (i.e., hard disk drives), have increased storage capacity and increased data access speed. With these advantages, magnetic disk drive devices have become widely used as auxiliary memory devices for computer systems. More generally, developments in pulse communications related to these improvements in disk drive technology have recently provided increased speed and reliability in a wide range of pulse communications systems. The present invention will be described in detail in the context of magnetic disk drive devices, but persons skilled in the pulse communications arts will readily apprehend that this invention provides an improved method for data pulse detection in a wide variety of pulse communication contexts.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modem magnetic disk drive devices.

A read channel circuit in a generic read/write channel circuit of a magnetic disk drive device includes components for initial processing of the analog read signal generated by the read/write head of the device. This processing provides automatic gain control (AGC) amplification, filtering, and equalization, as well as analog-to-digital conversion.

As a real densities increase, inter-symbol interference (ISI), transition-dependent noise and non-linear distortions at high densities, and bandwidth limitations at high data rates lead to performance degradation. For example, the level of inter-symbol interference between neighboring recorded bits in magnetic recording channels increases with recording density. The read-write channels that are currently most commonly used are based on the partial response approach. In this approach, the channel impulse and a Viterbi detector are used for detecting the data pulses in the digitized read signal and recovering the bits. Advanced replay equalizations have been adopted in the magnetic recording technology to shape the channel pulse response to some specified target shape, which has a shorter duration (higher bandwidth) and this is called partial-response signaling or equalization. A Viterbi detector that is matched to the target shape normally follows the partial response equalizer. Maintaining precisely the desired partial response shape through adaptive equalizations at the channel output permits the Viterbi detector to be efficiently realized and hence improving the bit detection quality. The overall task of the detector is to recover the encoded data that was originally recorded on the magnetic medium.

In this context, such a detector receives an equalized digital read signal and generates from it an encoded data signal, which is then decoded to produce the final read data signal. The various components in such a read/write channel circuit introduce into the design and manufacturing process various parameters whose values affect the data storage density and the access speed of the device.

At the heart of the Viterbi decoding algorithm is the trellis, which is an extension of the encoder state machine that shows the passage of time. A section of the trellis shows the possible state transitions and output codewords for one period of the encoder. Every branch between two states represents a possible state change in the encoder. The Viterbi procedure determines the best path (most likely sequence of symbols from a finite alphabet) ending in each state j, where state j represents the memory in the channel, by comparing the samples in the sample sequence $y_0, y_1, \ldots y_n$ to the expected sequence of read back samples associated with all possible paths that can end in state j at time n.

The "best path" is determined typically by comparing the Euclidean distance between the actual and expected read back sample sequences. This Euclidean distance is often referred to as the state metric (also called the path metric). The best path ending in state j is often defined to be the expected read back sample sequence with the smallest state metric. As known in the art, the state metric can be defined in terms other than the Euclidean distance.

The Euclidean branch metrics may be adjusted based on data dependent noise or its signal dependent structure. However, to adjust the Euclidean branch metrics, separate functions for various states are required. The conventional Viterbi detector operating on an arbitrary generalized partial-response target with L coefficients requires $2^{L-1}$ states with $2^L$ branch metrics. For example, for a target having a length of 5, a 16 state Viterbi is needed.

As recording density increases, higher order targets become necessary and the size and complexity of the Viterbi detector circuit increases exponentially as a function of the above-described partial response order n. In other words, the number of states required in detection grows exponentially with target length and predictor length. In one study, the equalization of a symmetric target of memory 4 was found to perform better than an asymmetric target of memory 3. In another study, a target of length 7 was found to give the best performance.

Nevertheless, the 16-state equalization target is currently the conventional approach for providing equalization in a PRML read data channel. However, the 16-state equalization target has many disadvantages. For example, a drawback of the native 16-state target conventional approach is that the native 16-state equalization target is a non-symmetrical target, which requires relatively large integer coefficients in order to make programmable with fine granularity. The programmable native 16-state equalization target is also difficult to implement in the gain and timing recovery loops because the 16-state equalization target lacks symmetry, requires large coefficients, and provides inconsistent derivative over programmable values while deriving the timing gradient.

Further, the programmable native 16-state equalization target does not lend itself to simple implementation of the Viterbi detector. A Euclidean metric implementation of the detector requires large branch metric coefficients using the native 16-state target. A matched filter metric implementation of the Viterbi detector requires a complicated programmable matched filter using the native 16-state target. Moreover, the coefficients of the native 16-state equalization target cannot be changed independently and still maintain the required DC null or often desired Nyquist null.

At high linear recording densities, generalized partial response polynomials with real coefficients provide a better match to the magnetic recording channel than partial response polynomials with integer coefficients do. However, such a system is complex to implement.

It can be seen then that there is a need for a Viterbi detector with an equalization target that provides improved performance over the conventional 16-state equalization target.

SUMMARY OF THE INVENTION

To overcome the limitations in the prior art described above, and to overcome other limitations that will become apparent upon reading and understanding the present specification, the present invention discloses an apparatus using a lengthened equalization target filter with a matched filter metric in a Viterbi detector.

The present invention solves the above-described problems by using an equalization target that includes a base partial response component, i.e., $(1-D^2)$, a fractional coefficient polynomial component to whiten the noise, i.e., $(1+p_1D+p_2D^2)$, and a time-reversed replica of the noise-whitening component. Thus, the time-reversed replica of the noise-whitening component comes from what was formerly a matched filter component.

A read channel in accordance with the principles of an embodiment of the present invention includes an equalizer configured to equalize a digital signal to provide equalized reproduced signals and a Viterbi detector capable of receiving the equalized reproduced signals and converting the reproduced signals into a digital output signal indicative of data stored on a recording medium, wherein the equalizer is implemented using a lengthened equalization target wherein the lengthened equalization target comprises a mathematical convolution of a first and a second transfer function, the first transfer function comprising a predetermined equalization target for providing desired shaping to the read signal and the second transfer function comprising a matched filter function providing a time-reversed component that is a time-reversed replica of a whitening filter component of the equalization target.

In another embodiment of the present invention, a signal processing system is provided. The signal processing system includes memory for storing data therein and a processor, coupled to the memory, for equalizing a digital signal to provide equalized reproduced signals using a lengthened equalization target, wherein the lengthened equalization target comprises a mathematical convolution of a first and a second transfer function, the first transfer function comprising a predetermined equalization target for providing desired shaping to the read signal and the second transfer function comprising a matched filter function providing a time-reversed component that is a time-reversed replica of a whitening filter component of the equalization target.

In another embodiment of the present invention, an equalizer is provided. The equalizer is implemented in accordance with a lengthened equalization target wherein the lengthened equalization target includes a mathematical convolution of a first and second transfer function, the first transfer function comprising a predetermined equalization target for providing desired shaping to the read signal and the second transfer function comprising a matched filter function providing a time-reversed component that is a time-reversed replica of a whitening filter component of the equalization target.

In another embodiment of the present invention, a magnetic storage device is provided. The magnetic storage device includes a magnetic storage medium for recording data thereon, a motor for moving the magnetic storage medium, a head for reading and writing data on the magnetic storage medium, an actuator for positioning the head relative to the magnetic storage medium and a data channel for processing encoded signals on the magnetic storage medium, the data channel comprising an equalizer implemented in accordance with a lengthened equalization target wherein the lengthened equalization target comprises a mathematical convolution of a first and second transfer function, the first transfer function comprising a predetermined equalization target for providing desired shaping to the read signal and the second transfer function comprising a matched filter function providing a time-reversed component that is a time-reversed replica of a whitening filter component of the equalization target.

In another embodiment of the present invention, another equalizer is provided. This equalizer is implemented in accordance with means for shaping a channel impulse response to a desired target shape, the means for shaping comprises a first means for providing desired shaping to the read signal and a second means for providing a time-reversed component that is a time-reversed replica of a whitening filter component of the means for shaping.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus using lengthened an equalization target filter with a matched filter metric in a Viterbi detector. The equalization target according to an embodiment of the present invention thus includes a base partial response component, i.e., $(1-D^2)$, a fractional coefficient polynomial component to whiten the noise, i.e., $(1+p_1D+p_2D^2)$, and a time-reversed replica of the noise-whitening component. Thus, the time-reversed replica of the noise-whitening component comes from what was formerly a matched filter component.

Figure 1:
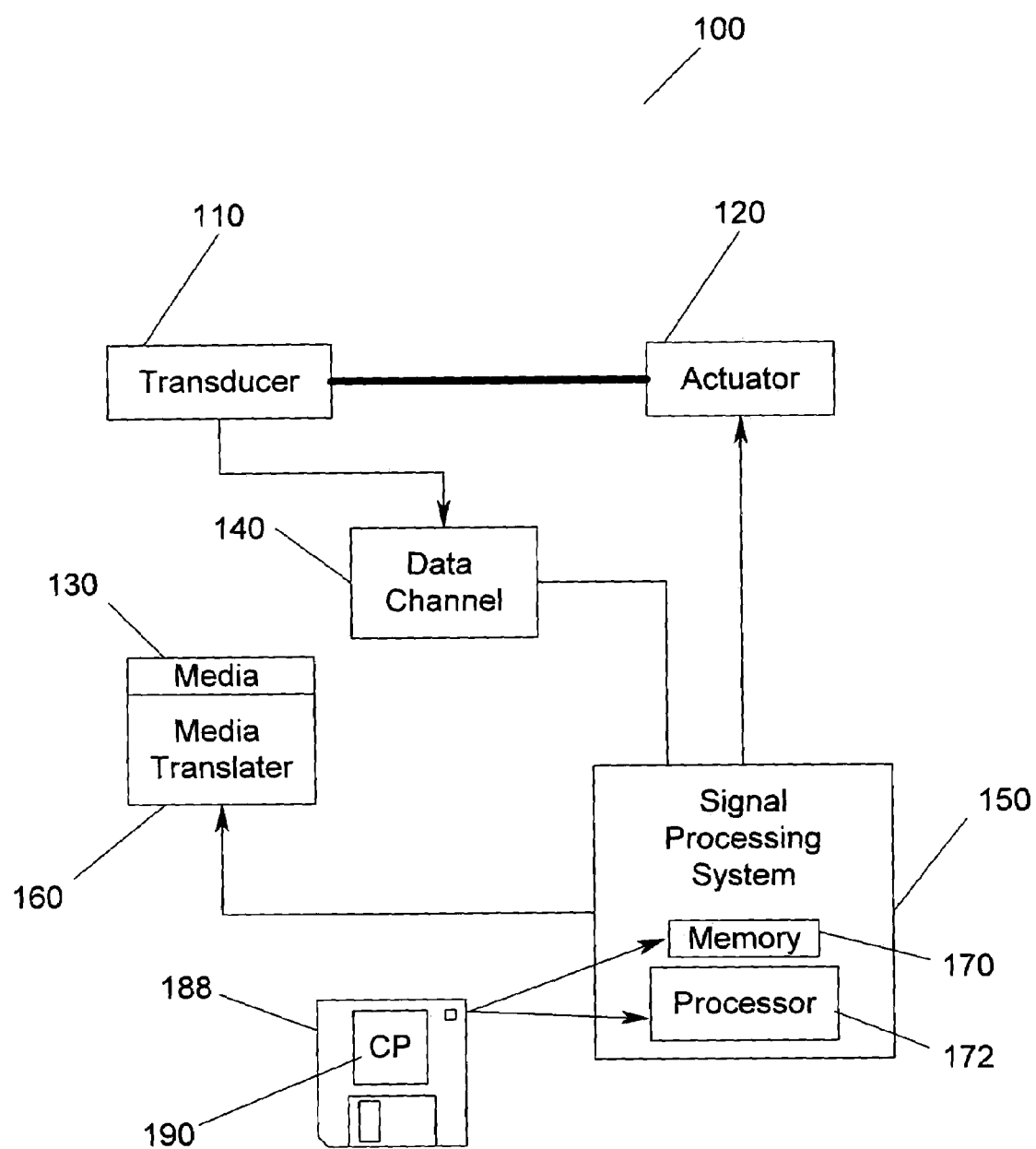
FIG. 1 illustrates a storage system according to an embodiment of the present invention.

FIG. 1 illustrates a storage system 100 according to an embodiment of the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. Nevertheless, the present invention is not meant to be limited to a particular type of storage system 100 or to the type of media 130 used in the storage system 100.

Figure 2:
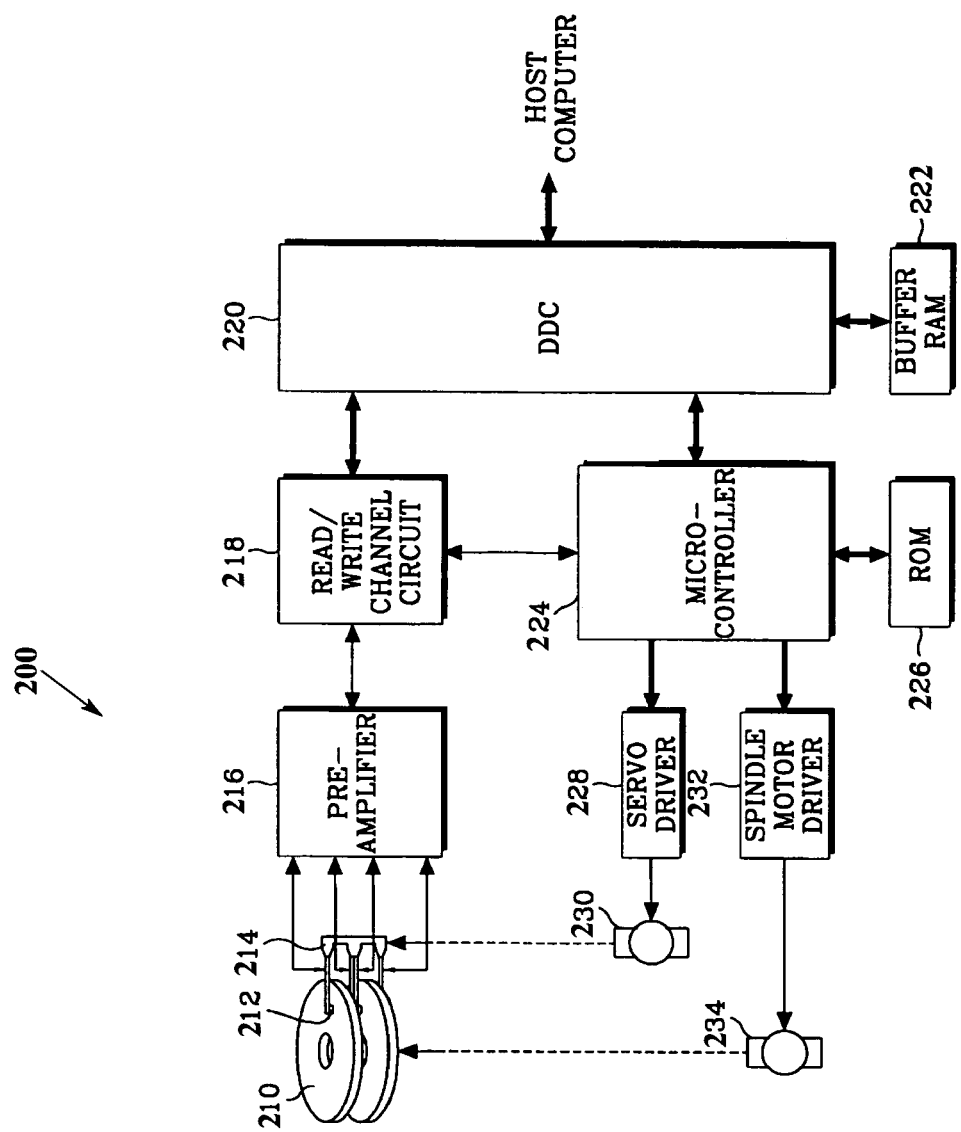
FIG. 2 is a block diagram of a magnetic disk drive device according to an embodiment of the present invention.

FIG. 2 is a block diagram of a magnetic disk drive device 200 according to an embodiment of the present invention. In FIG. 2, disks 210 are rotated by a spindle motor 234, and heads 212 are positioned at surfaces of corresponding ones of disks 210. Heads 212 are mounted on corresponding servo arms that extend from an E-shaped block assembly 214 to disks 210. Block assembly 214 has an associated rotary voice coil actuator 230 that moves block assembly 214 and thereby changes to positions of heads 212 for reading data from or writing data to a specified position on one or more of disks 210.

A pre-amplifier 216 pre-amplifies a signal picked up by heads 212 and thereby provides read/write channel circuit 218 with an amplified signal during a reading operation. During a write operation, pre-amplifier 216 transfers an encoded write data signal from the read/write channel circuit 218 to heads 212. In a read operation, read/write channel circuit 18 detects a data pulse from a read signal provided by pre-amplifier 216 and decodes the data pulse. Read/write channel circuit 218 transfers the decoded data pulse to a disk data controller (DDC) 20. Furthermore, read/write channel circuit 18 also decodes write data received from the DDC 220 and provides the decoded data to pre-amplifier 216.

DDC 220 both writes data received from a host computer (not shown) onto disks 210, through read/write channel circuit 18 and pre-amplifier 216, and transfers read data from disks 210 to the host computer. DDC 220 also interfaces between the host computer and a microcontroller 224. A buffer RAM (Random Access Memory) 222 temporarily stores data transferred between DDC 220 and the host computer, microcontroller 224, and read/write channel circuit 218. Microcontroller 224 controls track seeking and track following functions in response to read and write commands from the host computer.

A ROM (Read Only Memory) 226 stores a control program for microcontroller 224 as well as various setting values. A servo driver 228 generates a driving current for driving actuator 230 in response to a control signal, generated from microcontroller 224 that provides control of the position of heads 212. The driving current is applied to a voice coil of actuator 230. Actuator 230 positions heads 212 relative to disks 210 in accordance with the direction and amount of the driving current supplied from servo driver 228. A spindle motor driver 232 drives spindle motor 234, which rotates disks 210, in accordance with a control value generated from microcontroller 224 for controlling disks 210.

Figure 3:
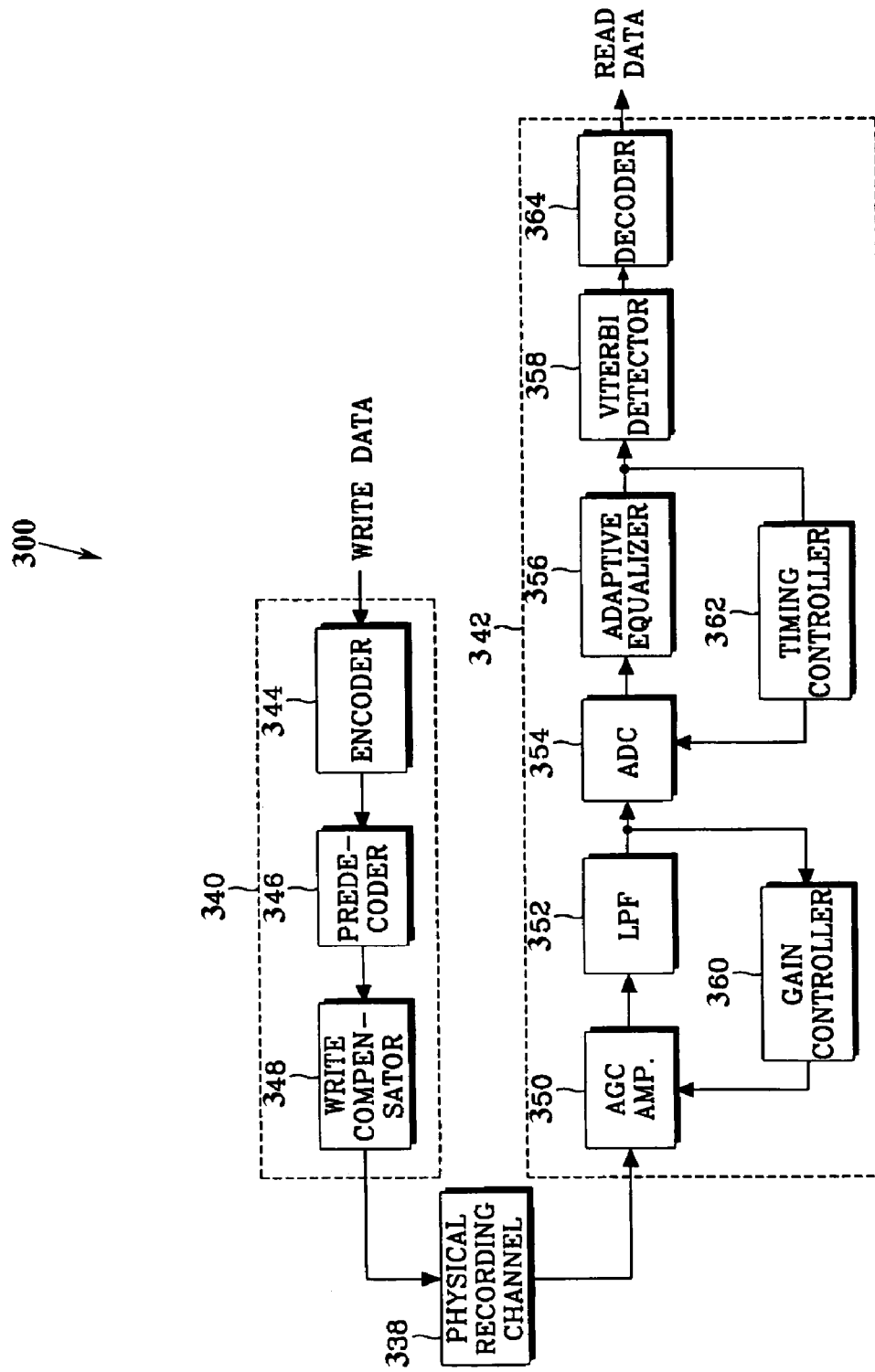
FIG. 3 is a block diagram of a read/write channel circuit of FIG. 2 that employs PRML detection.

FIG. 3 is a block diagram of a read/write channel circuit 300 of FIG. 2 that employs PRML detection. In FIG. 3, the read/write channel circuit 300 includes a physical recording channel 338 having a read/write means and a recording medium, a write channel circuit 340 for writing data onto the recording medium, and a read channel circuit 342 for reading data from the recording medium. Write channel circuit 340 is composed of an encoder 344, a pre-decoder 346, and a write compensator 348. Read channel circuit 342 is composed of an automatic gain control (AGC) amplifier 350, a low pass filter (LPF) 352, an analog-to-digital converter (ADC) 354, an adaptive equalizer 356, a Viterbi detector 358, a gain controller 360, a timing controller 362, and a decoder 364. The Viterbi detector 358 includes a matched filter (not shown in FIG. 3).

In operation, encoder 344 encodes write data, input to be written onto the recording medium, into a predetermined code. For example, an RLL (Run Length Limited) code, in which the number of adjacent zeros must remain between specified maximum and minimum values, is commonly used for this predetermined code. However, the present invention is not meant to be limited to RLL and other coding may be used. Pre-decoder 346 is included to prevent error propagation. Write compensator 348 reduces, non-linear influences arising from the read/write head. However, because the response of the actual recording channel does not exactly coincide with this transfer function, some subsequent equalization is always required.

Automatic gain control (AGC) amplifier 350 amplifies an analog signal read from the disk. Low pass filter 352 removes high frequency noise from and reshapes the signal output from AGC amplifier 350. The signal output from low pass filter 352 is converted into a discrete digital signal by analog-to-digital (A/D) converter 354. The resulting digital signal is then applied to adaptive equalizer 356, which adaptively controls inter-symbol interference (ISI) to generate desired waveforms. Viterbi detector 358 receives the equalized signal output from adaptive equalizer 356 and from it generates encoded data. Decoder 64 decodes the encoded data output from Viterbi detector 358 to generate the final read data. At the same time, in order to correct the analog signal envelope and the digitization sample timing, gain controller 360 controls the gain of AGC amplifier 350 and timing controller 362 controls sample timing for A/D converter 354.

Figure 4:
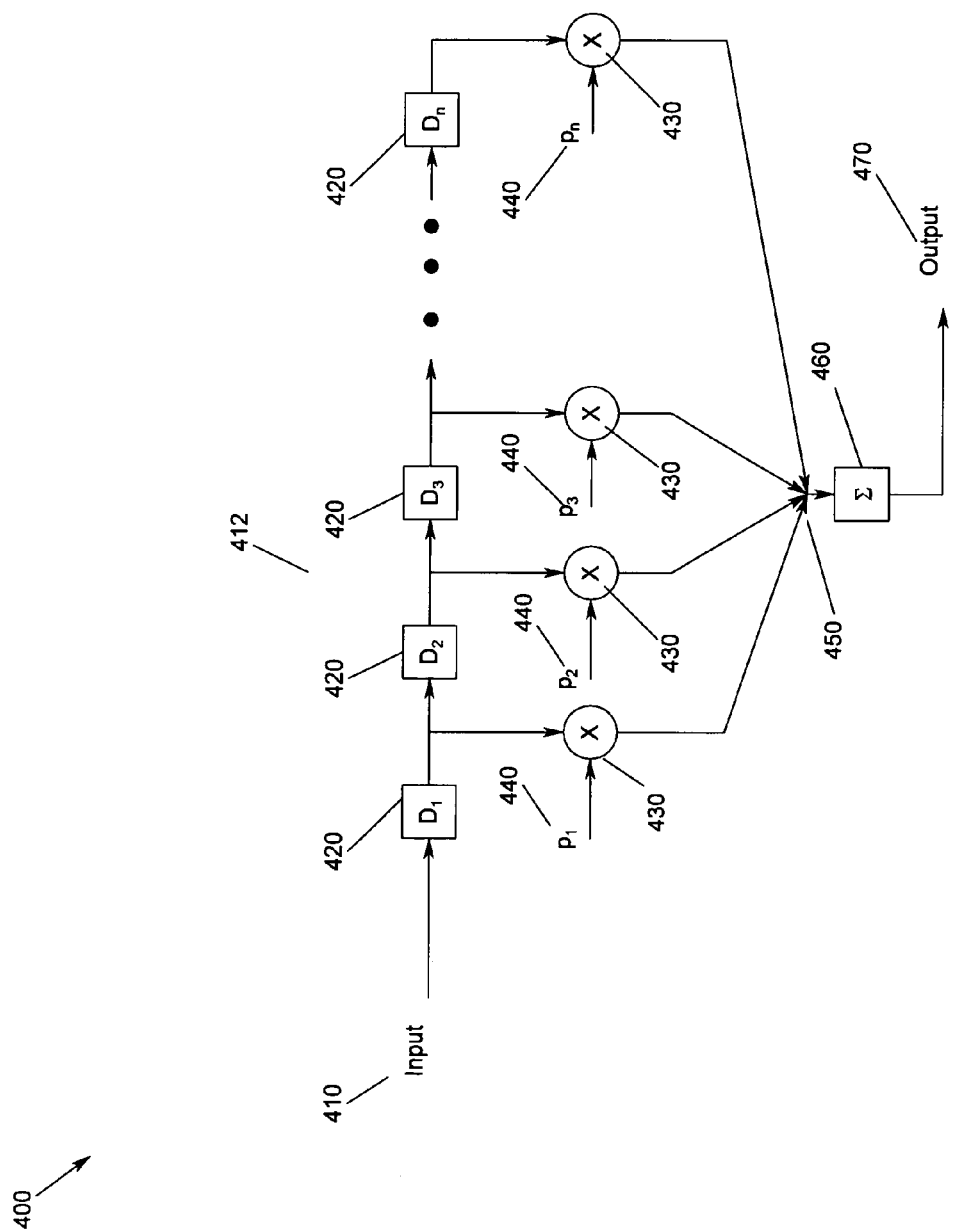
FIG. 4 illustrates an equalizer according to an embodiment of the present invention.

FIG. 4 illustrates an equalizer 400 according to an embodiment of the present invention. In FIG. 4, an input signal 410 is fed into a shift register circuit 412. With each successive input to the shift register, the values of the memory elements 420 are tapped off. The tapped signals may be multiplied 430 by selected coefficients 440. The resulting tapped signals 450 are then added 460 to provide an output 470.

Figures 5, 6, 7:
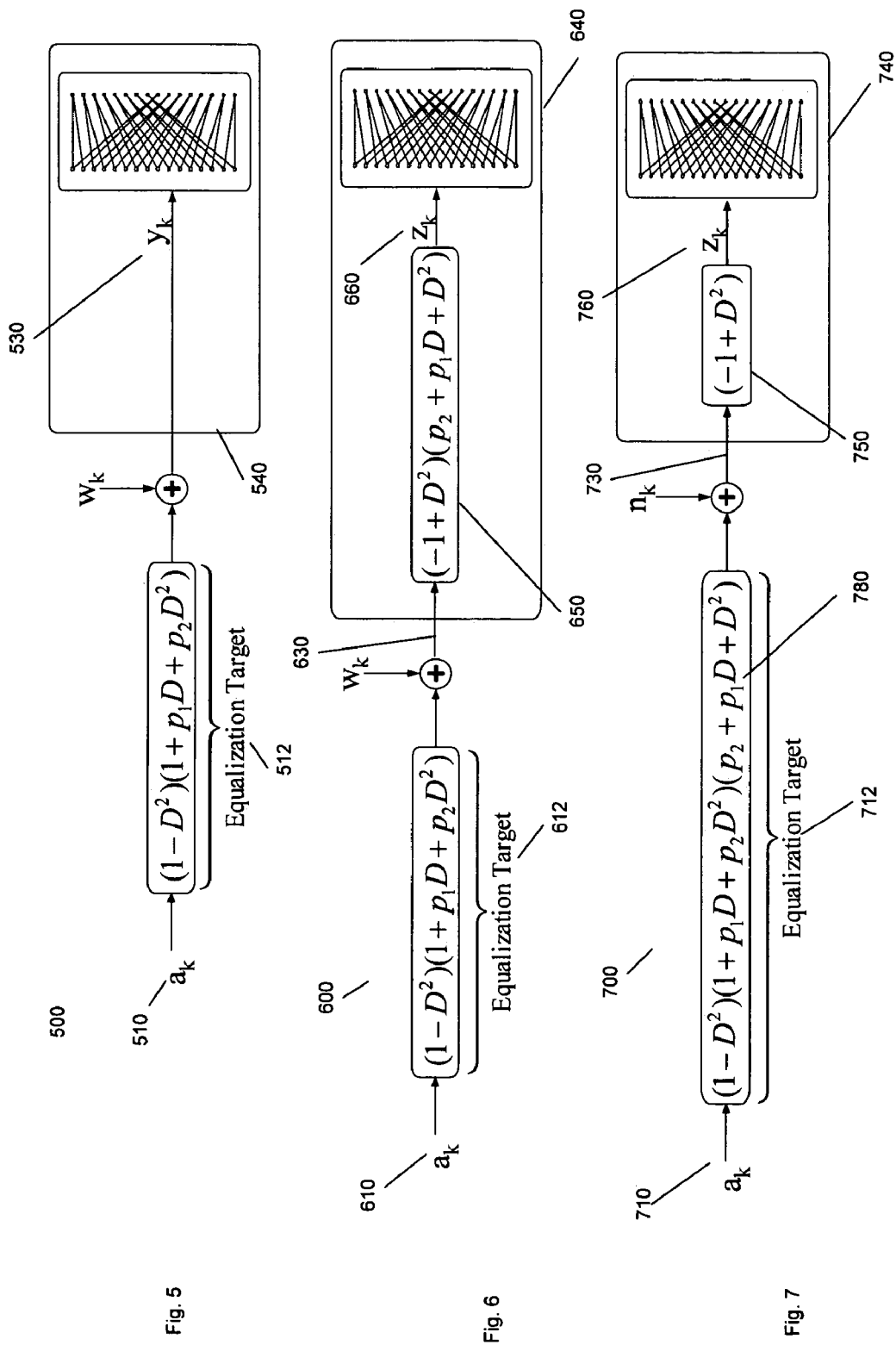
FIG. 5 illustrates a block diagram of a data channel that uses a conventional equalization target.
FIG. 6 illustrates a block diagram of a data channel that uses a conventional equalization target and a matched filter metric.
FIG. 7 illustrates a block diagram of a data channel that uses a matched 16 state equalization target and a matched filter metric according to an embodiment of the present invention.

FIG. 5 illustrates a block diagram 500 of a data channel that uses a conventional equalization target. In FIG. 5, a readback signal $a_k$ 510 is applied to the equalizer represented by the equalizer target 512 given by $(1-D^2)(1+p_1D+p_2D^2)$. A noise whitened target $y_k$ 530 is produce at the input of the Viterbi detector 540.

FIG. 6 illustrates a block diagram 600 of a data channel that uses a conventional equalization target and a matched filter metric. In FIG. 6, a readback signal $a_k$ 610 is applied to the equalizer having an equalizer target 612 given by $(1-D^2)(1+p_1D+p_2D^2)$. The equalization target 612 thus includes a base partial response component, i.e., $(1-D^2)$, and a fractional coefficient polynomial component to whiten the noise, i.e., $(1+p_1D+p_2D^2)$. A noise whitened target $y_k$ 630 is provided at the input of the matched filter 650. The matched filter 650 is given by $(-1+D^2)(p_2+p_1D+D^2)$. The matched filter 650 provides an output $z_k$ 660 to the Viterbi detector 640. The matched filter 650 facilitates transformation of the decoded output. Thus, the block diagram 600 of FIG. 6 provides Euclidean metric detection.

FIG. 7 illustrates a block diagram 700 of a data channel that uses a matched 16 state equalization target and a matched filter metric. In FIG. 7, a readback signal $a_k$ 710 is applied to the equalizer represented by a matched 16-state equalizer target 712 given by $(1-D^2)(1+p_1D+p_2D^2)(P_2+p_1D+D^2)$. A portion of the matched 16-state equalizer target 712 is formerly part of the matched filter 750. A noise target $y_k$ 730 is provided at the input of the matched filter 750. The matched filter 750 is given by $(-1+D^2)$. The matched filter 750 provides an output $z_k$ 760 to the Viterbi detector 740.

The matched 16-state (MS16) equalization target 712 is provided by rearranging components of the equalization target with components of the matched filter. The equalization target 712 thus includes a base partial response component, i.e., $(1-D^2)$; a fractional coefficient polynomial component to whiten the noise, i.e., $(1+p_1D+p_2D^2)$, and a time-reversed replica of the noise-whitening component 780. Thus, the time-reversed replica of the noise-whitening component 780 comes from the matched filter components shown in FIG. 6.

The matched 16-state equalizer target 712 may be represented by $(1+aD+bD^2-bD^4-aD^5-D^6)$, where $a=(p_1/p_2)+p_1$ and $b=((p_1^2+1)/p_2)+p_2-1$. The MS16 equalization target 712 is a symmetrical target with only two parameters for programming. The, a and b parameters allow great flexibility in target response and each can be changed independently while still maintaining a null at DC and at Nyquist.

The MS16 equalization target 712 also exhibits less high frequency energy than the native 16-state equalization target 512, 612 shown in FIGS. 5-6. Very low resolution systems can also be equalized more readily by using the MS16 equalization target 712.

The MS16 equalization target 712 exhibits less SER loss due to tap weight quantization effects. The hardware needs to store the tap weights of the equalization FIR in a finite precision. When these tap weights are quantized, some loss in SER occurs. The MS16 equalization target 712 is superior in this area.

The MS16 equalization target 712 allows the use of a very simple non-programmable matched filter 750 prior to Viterbi detector 740. It has been demonstrated that the overall required precision after the equalization FIR is less when using the MS16 Target 712.

Figure 8:
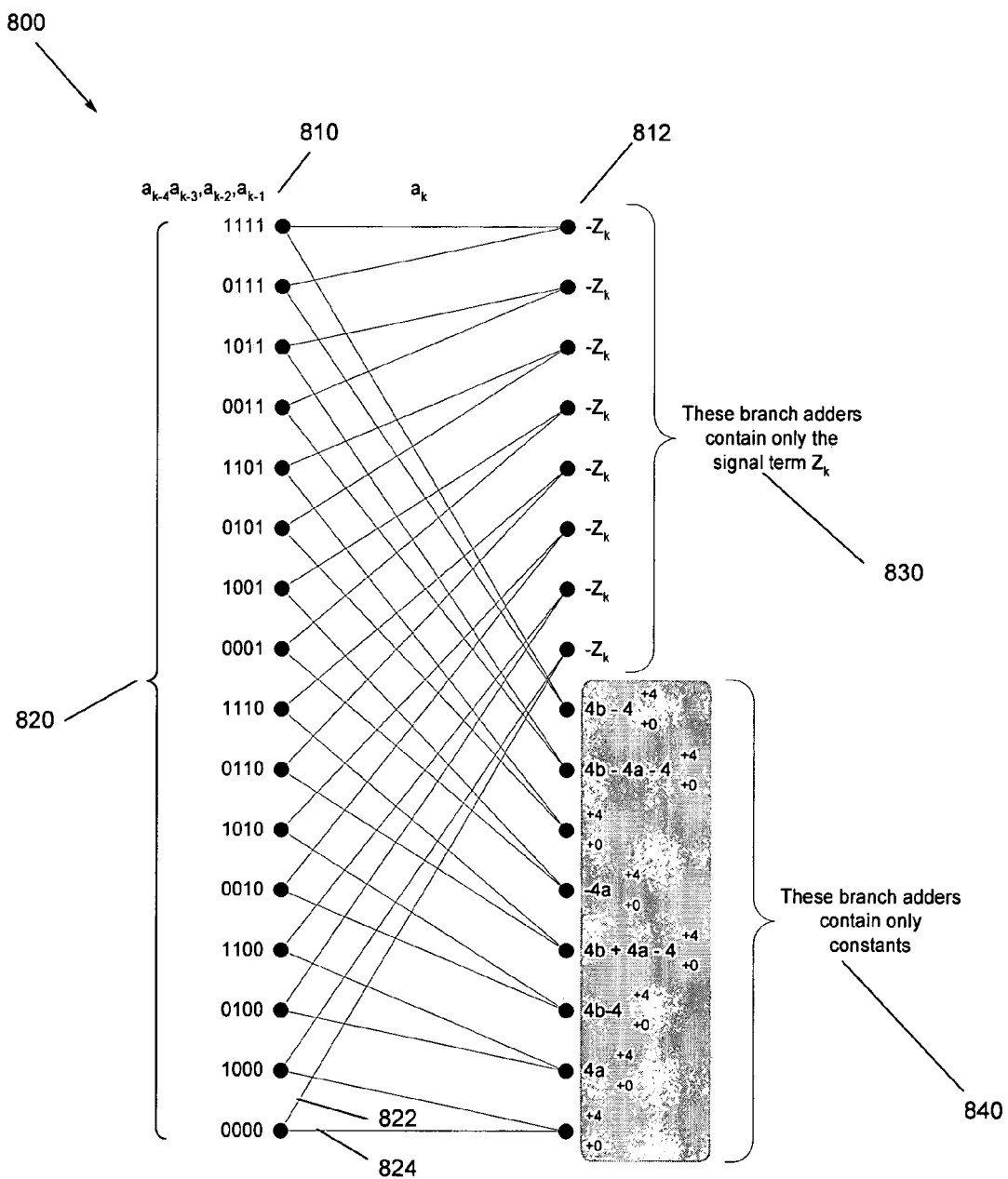
FIG. 8 illustrates a matched filter metric trellis structure according to an embodiment of the present invention.

FIG. 8 illustrates a matched filter metric trellis structure 800 according to an embodiment of the present invention. In FIG. 8, the initial codeword states 810 are shown on the left with the possible subsequent codeword states 812 represented on the right. Every codeword is associated with a unique path through the trellis diagram. A trellis diagram has $2^M$ nodes at each stage or time increment t. In FIG. 8, there are 16 nodes 820. There are 2 branches 822, 824 leaving each node. The branches from each node representing possible paths form each node or input value. As can be seen in FIG. 8, the top eight branch adders 830 contain only the signal term $z_k$ and the bottom eight branches 840 contain only constants a and b. As described above, a and b are programmable constants and reflect the programmable detection target in use.

The process illustrated with reference to FIGS. 1-8 may be tangibly embodied in a computer-readable medium or carrier, e.g. one or more of the fixed and/or removable data storage devices 188 illustrated in FIG. 1, or other data storage or data communications devices. The computer program 190 may be loaded into memory 170 to configure the processor 172 for execution of the computer program 190. The computer program 190 include instructions which, when read and executed by a processor 172 of FIG. 1, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A read channel, comprising:
an equalizer configured to equalize a digital signal to provide equalized reproduced signals; and
a Viterbi detector capable of receiving the equalized reproduced signals and converting the reproduced signals into a digital output signal indicative of data stored on a recording medium;
wherein the equalizer is implemented using a lengthened equalization target wherein the lengthened equalization target comprises a mathematical convolution of a first and a second transfer function, the first transfer function comprising a predetermined equalization target for providing desired shaping to the read signal and the second transfer function comprising a matched filter function providing a time-reversed component that is a time-reversed replica of a whitening filter component of the equalization target.

2. The read channel of claim 1, wherein the predetermined equalization target comprises a 16-state equalization target having a length of 7.

3. The read channel of claim 1, wherein lengthened equalization target is symmetrical and comprises only two programmable parameters.

4. The read channel of claim 1, wherein coefficients of the lengthened equalization target are independently adjustable while maintaining a DC null and a desired Nyquist null.

5. The read channel of claim 1, wherein the lengthened equalization target comprises a base partial response component, a fractional coefficient polynomial component and a time-reversed replica of the fractional coefficient polynomial component.

6. The read channel of claim 1, wherein the lengthened equalization target has the form $(1-D^2)(1+p_1D+p_2D^2)(p_2+p_1D+D^2)$.

7. The read channel of claim 1, wherein the lengthened equalization target has the form $(1+aD+bD^2-bD^4-aD^5-D^6)$, wherein a is equal to (p1/p2)+p1 and b is equal to $((p_1^2+1)/p_2)+p_2-1$.

8. The read channel of claim 7, wherein a and b are programmable.

9. A signal processing system, comprising:
memory for storing data therein; and
a processor, coupled to the memory, for equalizing a digital signal to provide equalized reproduced signals using a lengthened equalization target, wherein the lengthened equalization target comprises a mathematical convolution of a first and a second transfer function, the first transfer function comprising a predetermined equalization target for providing desired shaping to the read signal and the second transfer function comprising a matched filter function providing a time-reversed component that is a time-reversed replica of a whitening filter component of the equalization target.

10. The signal processing system of claim 9, wherein the predetermined equalization target comprises a 16-state equalization target having a length of 7.

11. The signal processing system of claim 9, wherein lengthened equalization target is symmetrical and comprises only two programmable parameters.

12. The signal processing system of claim 9, wherein coefficients of the lengthened equalization target are independently adjustable while maintaining a DC null and a desired Nyquist null.

13. The signal processing system of claim 9, wherein the lengthened equalization target comprises a base partial response component, a fractional coefficient polynomial component and a time-reversed replica of the fractional coefficient polynomial component.

14. The signal processing system of claim 9, wherein the lengthened equalization target has the form $(1-D^2)(1+p_1D+p_2D^2)(p_2+p_1D+D^2)$.

15. The signal processing system of claim 9, wherein the lengthened equalization target has the form $(1+aD+bD^2-bD^4-aD^5-D^6)$, wherein a is equal to (p1/p2)+p1 and b is equal to $((p_1^2+1)/p2)+p_2-1$.

16. The signal processing system of claim 15, wherein a and b are programmable.

17. An equalizer implemented in accordance with a lengthened equalization target wherein the lengthened equalization target comprises a mathematical convolution of a first and second transfer function, the first transfer function comprising a predetermined equalization target for providing desired shaping to the read signal and the second transfer function comprising a matched filter function providing a time-reversed component that is a time-reversed replica of a whitening filter component of the equalization target.

18. The equalizer of claim 17, wherein lengthened equalization target is symmetrical and comprises only two programmable parameters.

19. The equalizer of claim 17, wherein coefficients of the lengthened equalization target are independently adjustable while maintaining a DC null and a desired Nyquist null.

20. The equalizer of claim 17, wherein the lengthened equalization target comprises a base partial response component, a fractional coefficient polynomial component and a time-reversed replica of the fractional coefficient polynomial component.

21. The equalizer of claim 17, wherein the lengthened equalization target has the form $(1-D^2)(1+p_1D+p_2D^2)(p_2+p_1D+D^2)$.

22. The equalizer of claim 17, wherein the lengthened equalization target has the form $(1+aD+bD^2-bD^4-aD^5-D^6)$, wherein a is equal to (p1/p2)+p1 and b is equal to $((p_1^2+1)/p_2)+p_2-1$.

23. The equalizer of claim 22, wherein a and b are programmable.

24. A magnetic storage device, comprising:
a magnetic storage medium for recording data thereon;
a motor for moving the magnetic storage medium;
a head for reading and writing data on the magnetic storage medium;
an actuator for positioning the head relative to the magnetic storage medium; and
a data channel for processing encoded signals on the magnetic storage medium, the data channel comprising an equalizer implemented in accordance with a lengthened equalization target wherein the lengthened equalization target comprises a mathematical convolution of a first and second transfer function, the first transfer function comprising a predetermined equalization target for providing desired shaping to the read signal and the second transfer function comprising a matched filter function providing a time-reversed component that is a time-reversed replica of a whitening filter component of the equalization target.

25. The magnetic storage device of claim 24, wherein the predetermined equalization target comprises a 16-state equalization target having a length of 7.

26. The magnetic storage device of claim 24, wherein lengthened equalization target is symmetrical and comprises only two programmable parameters.

27. The magnetic storage device of claim 24, wherein coefficients of the lengthened equalization target are independently adjustable while maintaining a DC null and a desired Nyquist null.

28. The magnetic storage device of claim 24, wherein the lengthened equalization target comprises a base partial response component, a fractional coefficient polynomial component and a time-reversed replica of the fractional coefficient polynomial component.

29. The magnetic storage device of claim 24, wherein the lengthened equalization target has the form $(1-D^2)(1+p_1D+p_2D^2)(p_2+p_1D+D^2)$.

30. The magnetic storage device of claim 24, wherein the lengthened equalization target has the form $(1+aD+bD^2-bD^4-aD^5-D^6)$, wherein a is equal to (p1/p2)+p1 and b is equal to $((p_1^2+1)/p_2)+p_2-1$.

31. The magnetic storage device of claim 30, wherein a and b are programmable.

32. An equalizer implemented in accordance with means for shaping a channel impulse response to a lengthened equalization target, wherein the means for shaping comprises means for convoluting a first and a second transfer function, wherein the first transfer function comprising a predetermined equalization target for providing desired shaping to the read signal and the second transfer function comprising a matched filter function providing a time-reversed component that is a time-reversed replica of a whitening filter component of the lengthened equalization target.

* * * * *